(12) United States Patent
Taylor

(10) Patent No.: US 11,037,074 B2
(45) Date of Patent: Jun. 15, 2021

(54) DIGITAL SEAT ORDERING AND MANAGEMENT

(71) Applicant: The Boeing Company, Chicago, IL (US)

(72) Inventor: David J. Taylor, Bothell, WA (US)

(73) Assignee: The Boeing Company, Chicago, IL (US)

( * ) Notice: Subject to any disclaimer, the term of this patent is extended or adjusted under 35 U.S.C. 154(b) by 1660 days.

(21) Appl. No.: 14/641,992

(22) Filed: Mar. 9, 2015

(65) Prior Publication Data

US 2016/0267398 A1    Sep. 15, 2016

(51) Int. Cl.
  *G06Q 10/00*    (2012.01)
  *G06Q 10/02*    (2012.01)
  *G06Q 10/06*    (2012.01)

(52) U.S. Cl.
  CPC ............ *G06Q 10/02* (2013.01); *G06Q 10/06* (2013.01)

(58) Field of Classification Search
  None
  See application file for complete search history.

(56) References Cited

U.S. PATENT DOCUMENTS

| | | | |
|---|---|---|---|
| 8,126,748 | B2 | 2/2012 | Sunshine et al. |
| 8,355,937 | B2 | 1/2013 | Halavais et al. |
| 8,806,543 | B1 | 8/2014 | Curtis et al. |
| 2002/0060246 | A1* | 5/2002 | Gobburu ............... G06Q 20/04 235/462.46 |
| 2005/0033634 | A1* | 2/2005 | Pugliese, III ......... G06Q 10/02 705/13 |
| 2007/0265890 | A1 | 11/2007 | Curtis |

(Continued)

FOREIGN PATENT DOCUMENTS

| | | |
|---|---|---|
| JP | 2014-191698 | 10/2014 |
| WO | WO 2011/061711 | 5/2011 |

OTHER PUBLICATIONS

FlyerTalk Reference, URL: https://www.flyertalk.com/forum/jetblue-trueblue/943982-passengers-removed-due-weight-balance.html Apr. 2009 (Year: 2009).*

(Continued)

*Primary Examiner* — Tonya Joseph
(74) *Attorney, Agent, or Firm* — McDonnell Boehen Hulbert & Berghoff LLP

(57) ABSTRACT

A method and system for improved ordering and management of a seat assignment at a venue are provided. The method comprises modifying seat identifiers associated with seat locations and outputting the seat identifiers to a display system. The method further comprises identifying first information, determining a first seating arrangement from the first information, wherein the first seating arrangement identifies the seat locations with the seat identifiers, identifying second information, and determining a second seating arrangement from the second information, wherein the seat identifiers are modified to reflect to the second seating arrangement. The second seating arrangement is generated after the first seating arrangement. The system comprises a display system in a venue and a processor configured to display seating information through the display system. The display system comprises a plurality of display devices associated with a plurality of seats.

19 Claims, 9 Drawing Sheets

(56) References Cited

U.S. PATENT DOCUMENTS

| | | | |
|---|---|---|---|
| 2009/0112638 A1* | 4/2009 | Kneller | G06Q 10/00 705/5 |
| 2011/0313826 A1 | 12/2011 | Keen et al. | |
| 2012/0010910 A1 | 1/2012 | Lele et al. | |
| 2012/0010911 A1 | 1/2012 | Lele et al. | |
| 2012/0010912 A1* | 1/2012 | Lele | G06Q 10/00 705/5 |
| 2014/0005070 A1 | 1/2014 | Stamler | |
| 2015/0051925 A1* | 2/2015 | Yudin | G06Q 10/02 705/5 |

OTHER PUBLICATIONS

Extended European Search Report issued in European Patent Application No. 16159409.8 dated May 20, 2016.

Communication pursuant to Article 94(3) EPC prepared by the European Patent Office in application No. 16 159 409.8, dated Apr. 3, 2019.

* cited by examiner

DIGITAL SEAT ORDERING AND MANAGEMENT

TECHNICAL FIELD

The present disclosure relates generally to digital seat ordering and management. Specifically, this disclosure relates to the use of digital displays to improve a seating arrangement in a venue, such as an airplane, a bus, a train, a stadium, an amusement park, or other venue.

BACKGROUND

Generally, when a customer receives an assigned seat for a flight, sporting event, etc., the seat assignment is fixed or is chosen by the customer at the time of the event. In the case of assigned seats, the seats are given a static seat identifier that is associated with the seat location for that venue and event. For example, on an airplane, a customer's seat assignment stays the same, regardless of the number of passengers on the plane, the weight distribution of passengers, and changes in schedules. The present arrangement causes loading and unloading/deplaning delays, which cost the airline money. Furthermore, improperly distributing passengers on the airplane may increase fuel costs.

SUMMARY

According to an exemplary embodiment, a method for seat ordering and management is provided. The method comprises modifying seat identifiers associated with seat locations in a venue and outputting the seat identifiers to a display system.

In another embodiment, a system for use in seat ordering and management is provided. The system comprises a display system in a venue and a processor configured to modify a seat identifier associated with a seat location and to display the seat identifier through the display system. The display system comprises a plurality of display devices associated with a plurality of seats.

In another embodiment, a method of deplaning is provided. The method comprises identifying deplaning information, generating a deplaning plan based on the deplaning information, and providing the deplaning plan to a passenger display screen. The display screen indicates when the passenger should deplane.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the example embodiments are set forth in the appended claims. The example embodiments, however, as well as a preferred mode of use, further objectives and descriptions thereof, will best be understood by reference to the following detailed description of an example embodiment of the present disclosure when read in conjunction with the accompanying drawings, wherein:

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

The herein-described method and system allows for improved ordering and management of a seat assignment at a venue such as an airplane or a sporting event. More specifically, this disclosure relates to digital seat ordering and management using a digital display, thus enabling flexibility in real time when designating seats. A first seating arrangement is determined according to methods known in the art, based on information such as seat availability, venue, user preferences, and requirements. A second seating arrangement is later determined based on updated information, and a display device is used to inform the user of this updated seating arrangement. The display device may be, for example, an LED or LCD screen. In other embodiments, the display device may be an existing passenger screen on the back of an airplane seat. The venue may be, for example, an airplane, a bus, a train, a stadium, an amusement park, or other venue where customers are assigned seats or locations.

Such a system for use in seat ordering and management comprises a display system in a venue and a processor configured to modify a seat identifier associated with a seat location (e.g., seat 1A) and to display the seat identifier through the display system. The display system may include a plurality of display devices associated with a plurality of seats, such as the display devices discussed above.

Figure 1:
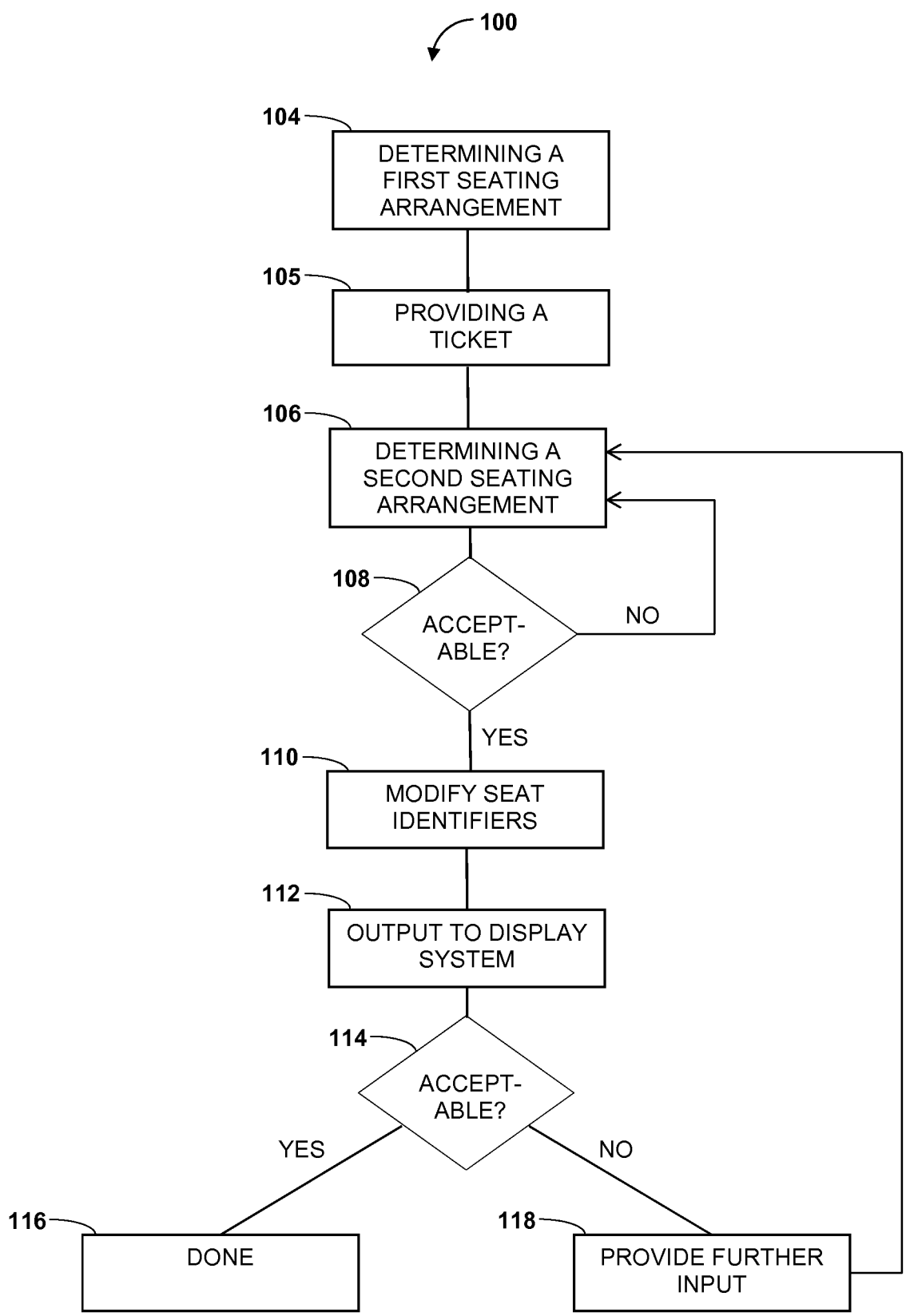
FIG. 1 is a diagrammatic representation of a digital seat ordering and management method in accordance with an example embodiment.

Referring more particularly to the drawings, FIG. 1 illustrates a digital seat ordering and management method 100 in accordance with an example embodiment. Exemplary method 100 may include determining a first seating arrangement (step 104). In some embodiments, the method 100 may also include the step 105 of providing a ticket to the passenger. For example, this first seating arrangement may include the seating numbers and letters that are provided to airline passengers on a ticket. Step 105 may occur at a time before a second seating arrangement is determined. In some embodiments, the ticket may be provided after the first seating arrangement is determined. In other embodiments, the ticket may be provided during determination of the first seating arrangement. For example, an airline may provide a ticket to a passenger immediately after the passenger has booked the plane ticket, even though the seating arrangement of all of the passengers has not yet been completely determined. The ticket may be paper or electronic (for example, displayed on a smart phone) and may include indicia representing the seat identifier (e.g, seat 1A) associated with a seat location in the first seating arrangement. During step 104, the first seating arrangement may be determined by any optimization technique known in the art, such as a simulated annealing algorithm. Simulated annealing is an optimization technique that is known in the art for determining an optimum state. The first seating arrangement may be determined by analyzing first information. The first information may be variables such as seat availability, safety requirements, fuel efficiency, cost, venue requirements, venue preferences, customer requirements, and/or customer preferences. Additional variables may also be considered.

The first seating arrangement may identify seat locations with seat identifiers. For example, on an airplane, the rows may be identified by sequential numbers and the seats in each row may be identified by sequential letters. The seat identifier may be provided to the customer. For example, the customer may receive a paper ticket or an email including indicia representing the seat identifier.

The first seating arrangement may be determined at any time in advance of an event such as a flight or a sporting event. In some instances, the first seating arrangement may be determined months before the event. In other instances, the first seating arrangement may be determined a few minutes before the event. However, circumstances may occur prior to the event in which the seating arrangement can be improved upon relative to the first seating arrangement. For example, a large number of airplane passengers may cancel their reservations shortly before a flight is scheduled to leave and as a result, the remaining passengers may be all sitting in the front of the plane, which is not preferred for fuel efficiency. Thus, during exemplary method 100, determining the second seating arrangement (step 106) occurs after determining the first seating arrangement (step 104). During step 106, optimization software is run to determine the second seating arrangement. For example, the second seating arrangement may be determined by any optimization technique known in the art, such as a simulated annealing algorithm. In example embodiments, thousands of arrangements may be analyzed before reaching the preferred second seating arrangement. The second seating arrangement may be determined by analyzing second information. The second information may be variables such as seat availability, safety requirements, fuel efficiency, cost, venue requirements, venue preferences, customer requirements, and/or customer preferences. Additional variables may also be considered. The second information may be different than the first information. For example, seat availability would change if passengers cancel their reservations.

Once the second seating arrangement has been determined, the method 100 includes the step of determining whether the second seating arrangement is acceptable (step 108). If the second seating arrangement is acceptable, then the seat identifier associated with the seat location is modified to reflect the second seating arrangement (step 110) and the seat identifiers are outputted to a display system (step 112). For example, an aisle seat in the first seating arrangement may have seat identifier 1C associated with it. After the second seating arrangement is determined, the same aisle seat may now have seat identifier 1B associated with it. The display system will show that the aisle seat is seat 1B. If the second seating arrangement is not acceptable, step 106 (determining the second seating arrangement) is repeated. The display system may include a plurality of display screens. The display screens may be, for example, LED or LCD screens, passenger display screens on an airplane, or any other digital displays known in the art. An example of such a display device for use in the display system is described in more detail below.

The acceptability of the second seating arrangement output is determined at step 114. If the output is acceptable, the method is complete (step 116). If the output is not acceptable, further input may be provided (step 118) and steps 106, 108, 110, 112, and 114 are repeated. For example, a mobile device may be used to provide further input. Step 114 allows for the ability to make changes at any time, even after the seat identifiers have been outputted to the display system, for example, if a customer has boarded the airplane and is sitting next to a crying baby or an unruly passenger.

The ticket provided in step 105 is not reissued or reprinted in response to determining the second seating arrangement (i.e., once a passenger receives a ticket with indicia 1B, they will sit in seat 1B, however, the seat associated with indicia 1B may be in a different location). Instead, the seat identifier associated with a particular seat location is modified, as discussed in further detail below (see FIGS. 4A, 4B, and 4C).

The exemplary method 100 may be completed in less than ten minutes. In preferred embodiments, the method 100 is completed in between about two and five minutes.

Figure 2:
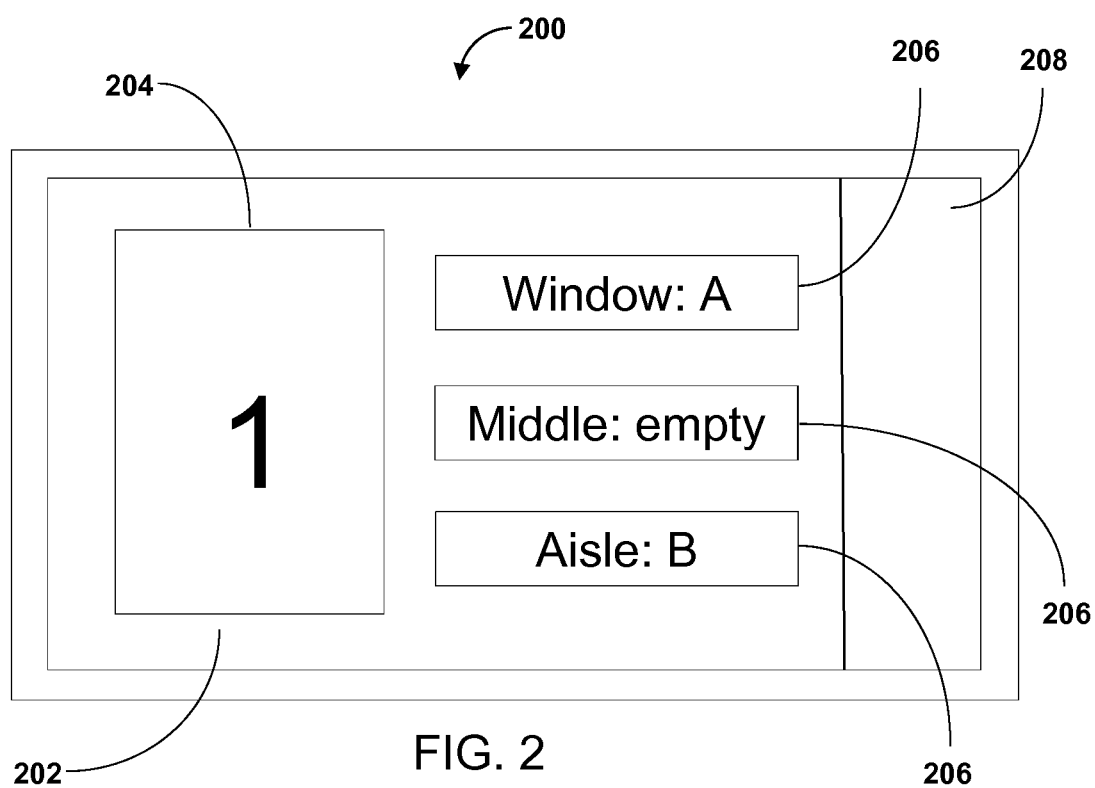
FIG. 2 is a diagrammatic representation a display screen in accordance with an example embodiment.

FIG. 2 illustrates an example display device 200 for use in a display system. The display device 200 includes a display screen 202. The display screen 202 may be, for example, an LED or LCD screen. In an example embodiment, the display device 200 may be about 3.5 to 4 inches wide. The display device 200 may be located above a row. In other embodiments, the display device 200 may be an existing passenger display screen located on the back of an airplane seat. Display device 200 may include multiple fields. In an example embodiment, the display device 200 includes a row field 204, a plurality of seat fields 206, and an auxiliary field 208. The auxiliary field 208 may include information such as the locations of other empty seats, bathroom availability, flight status, etc. When the display device 200 is digital, a variety of field types and arrangements are possible. In some embodiments, the display device 200 may be a simple LED device that identifies a row (e.g., using a row number, row letter, or some other seat identifier) and identifies a seat position (e.g., using a seat letter, seat number, or some other seat identifier).

In example embodiments, the presently disclosed method could be used in conjunction with existing passenger seat displays. For example, seat numbers, seat letters, or any identifying graphic or symbol on an existing passenger seat display, such as colors or images, could be used in conjunction with a ticket to indicate where a person could sit. Such displays could be used in place of an LED screen, thus alleviating the need for additional equipment. In other embodiments, the passenger seat displays may be used to reserve seats, thus indicating the seats that are not available or reserved. For example, X marks or another identifying feature could be used to indicate a seat is being reserved in order to preserve a proper load balance, or accommodate for contingent-based passengers like families or those with handicaps. This embodiment could be used by airlines who do not provide passenger seat assignments (such as Southwest®), thus allowing the airline to properly balance the plane and to accommodate passengers by reserving specific seats without changing their seating model.

In other embodiments, an LED display screen may use a short range wireless network instead of using wired LEDs.

This network could form an interconnected network of LED display screens, allowing easier integration onto current products.

Figure 3:
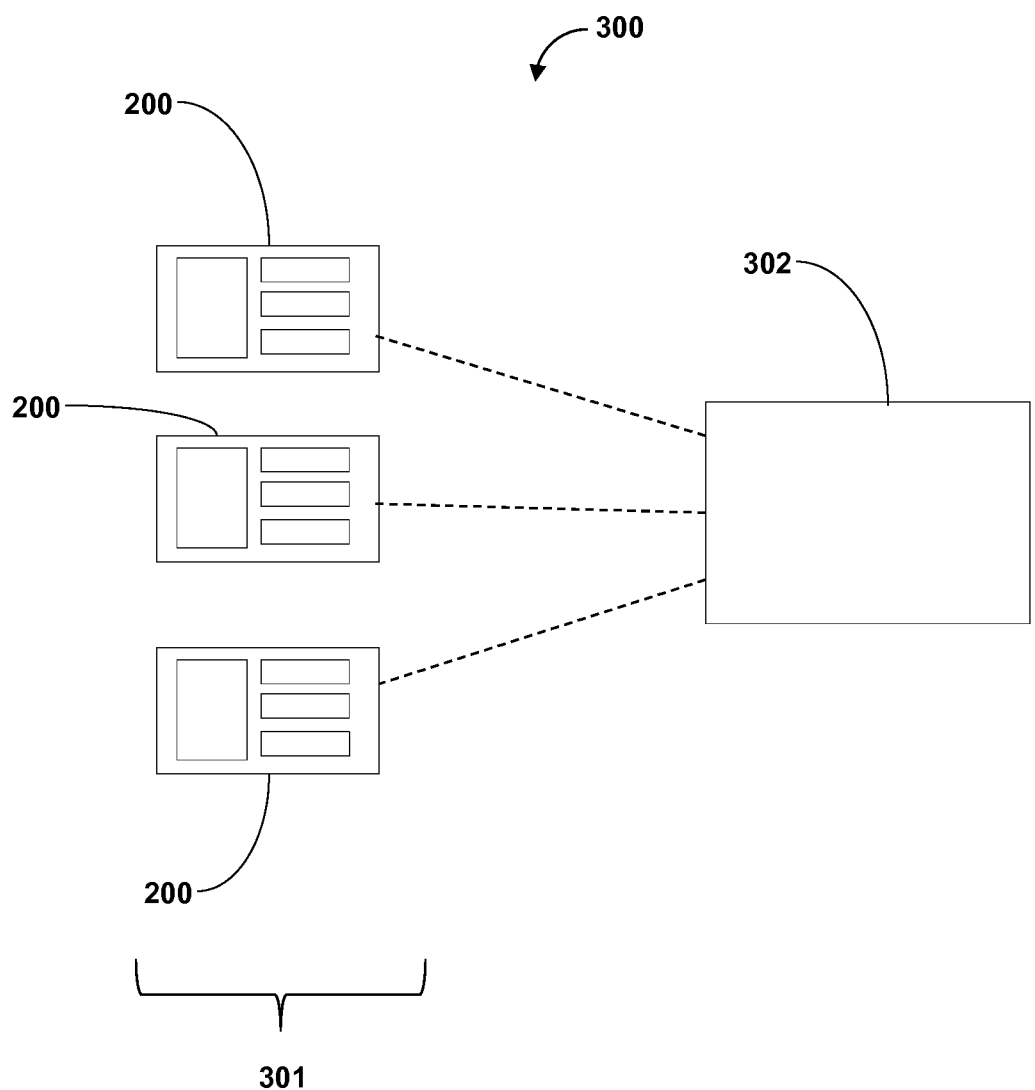
FIG. 3 is a diagrammic representation of a system in accordance with an example embodiment.

FIG. 3 illustrates an example system 300 comprising a display system 301 comprising display devices 200 (see FIG. 2) and processor 302. Processor 302 may be configured to display seating information through the display devices 200. The seating information may, for example, be seat identifiers, seating availability, or deplaning information.

Method 100 may be used for a variety of situations. For example, last minute changes to a flight's itinerary can affect seat ordering. Using the method of the present disclosure, airlines will have the ability to change the seating arrangement of passengers when interruptions (e.g., a crying baby, an unruly passenger, a sick passenger, etc.) to the flight's current seating arrangement occur. This will enable grater fuel efficiency and more contented passengers.

Figure 4A:
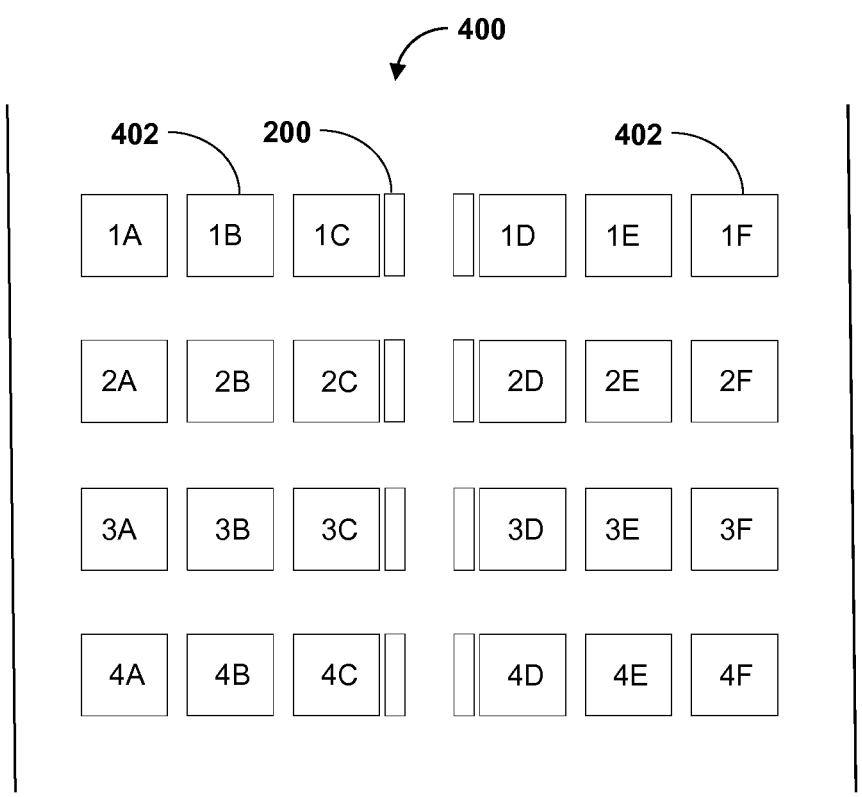
FIGS. 4A, 4B, and 4C are diagrammic representations of seating arrangements for a portion of an airplane, in accordance with an example embodiment.
Figure 4B:
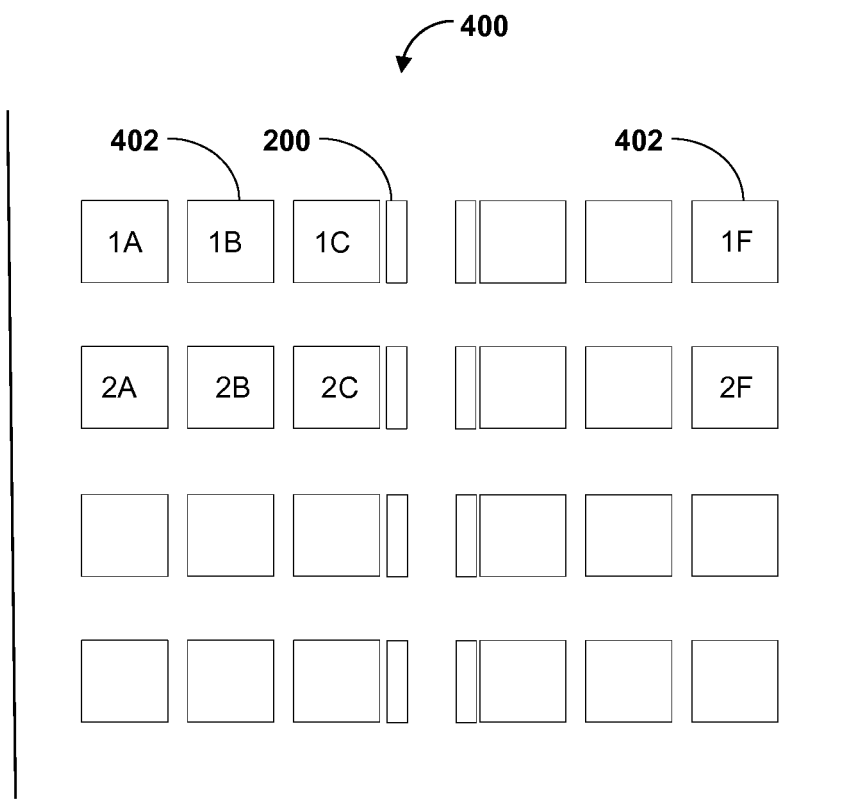
Figure 4C:
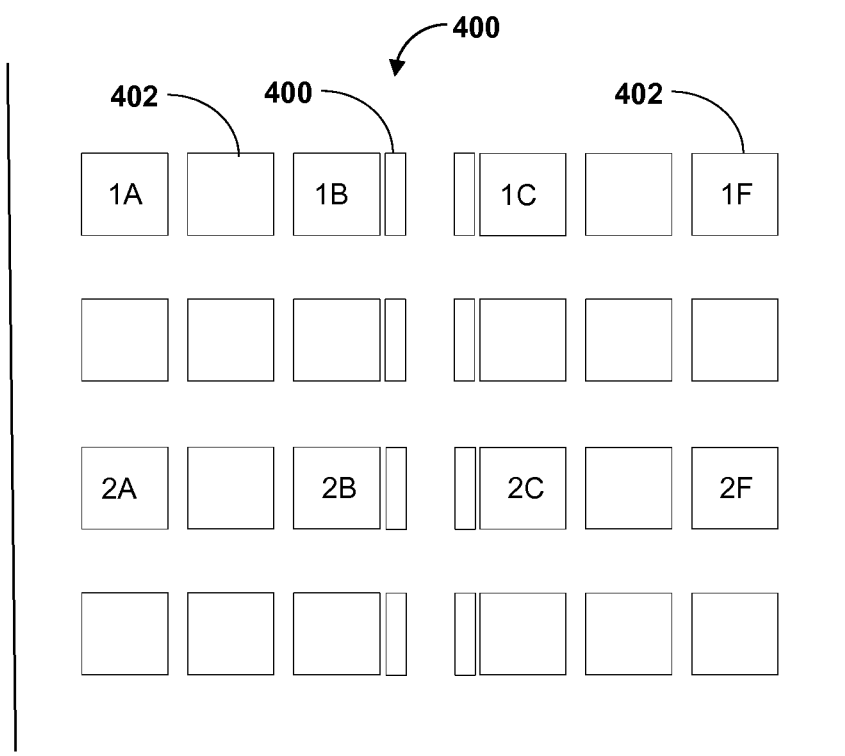

FIGS. 4A, 4B, and 4C, which are diagrammatic representations of seats 402 and display devices 200 (see FIG. 2) in four rows of an airplane, illustrate use of method 100 in FIG. 1 to determine the preferred seating arrangement for the airplane. In FIG. 4A, airplane seating arrangement 400 shows seat identifiers (row numbers and seat letters) for available seat locations in four rows of an airplane. In this example, all of the available seats are purchased and the first seating arrangement step 104 of FIG. 1 places the passengers in the seats in rows 1-4. Passengers are provided tickets with indicia representing the seat identifiers 1A, 1B, 1C, etc.

FIG. 4B shows the first seating arrangement after 16 of the 24 passengers have cancelled their reservations. As shown in FIG. 4B, all of the remaining passengers are in the first and second rows.

In order to balance the weight on the airplane, the second seating arrangement step 106 is then performed and a second seating arrangement is determined as shown in FIG. 4C, spreading out the passengers within the four rows. Seat identifiers for the seat locations are then modified to reflect the second seating arrangement. The seat identifiers for the updated seating arrangement are outputted to a display system (step 112), such as display device 200 shown in FIG. 2. A processor (such as processor 302 in FIG. 3) may be configured to modify the seat identifier associated with a seat location. The processor 302 may also be configured to display the seat identifier on a display device 200. The display device 200 may be located above the seat in the aisle of the airplane and could replace standard seat ordering (i.e., a sign showing row numbers and seat letters). For example, display device 200 (see FIG. 2) for row 1 in FIG. 4C would show that seat 1A is the window seat, the middle seat is empty, and seat 1B is the aisle seat. The tickets provided earlier are not reissued (i.e., the indicia on the ticket is not changed). Instead, the seat identifiers associated with a particular seat location are modified (i.e., the aisle seat in the first row now is identified as seat 1B rather than seat 1C).

Method 100 (FIG. 1) may also be used to manage unexpected passenger related events such as a baby crying, someone feeling sick, or someone being unruly. In such a situation, a flight attendant could use method 100 to determine the second seating arrangement based on the new information (the unexpected event) and could discreetly accommodate passenger requests, thus enhancing the overall passenger flight experience.

Method 100 could also be used to allow passengers to take advantage of empty rows. For example, the second information could include the location of the empty row. Passengers could then be presented with the opportunity to upgrade to the empty row.

Another problem that the systems and methods of the present disclosure may assist with is deplaning passengers. When deplaning, the passengers in the front of the plane tend to think they should go first. The better approach for everyone is to allow the aisles to go first, starting with the aisle seats in the front of the plane. This eliminates the bottleneck of the window passengers making everyone behind them wait for them to get their luggage out of the overhead bins. The display screens of the present disclosure could assist this approach by indicating when it is a passenger's turn to load or unload. Software could be used in conjunction with the seat display screens to indicate to a passenger when he/she should stand up in order to allow a more efficient unload process.

Figure 5A:
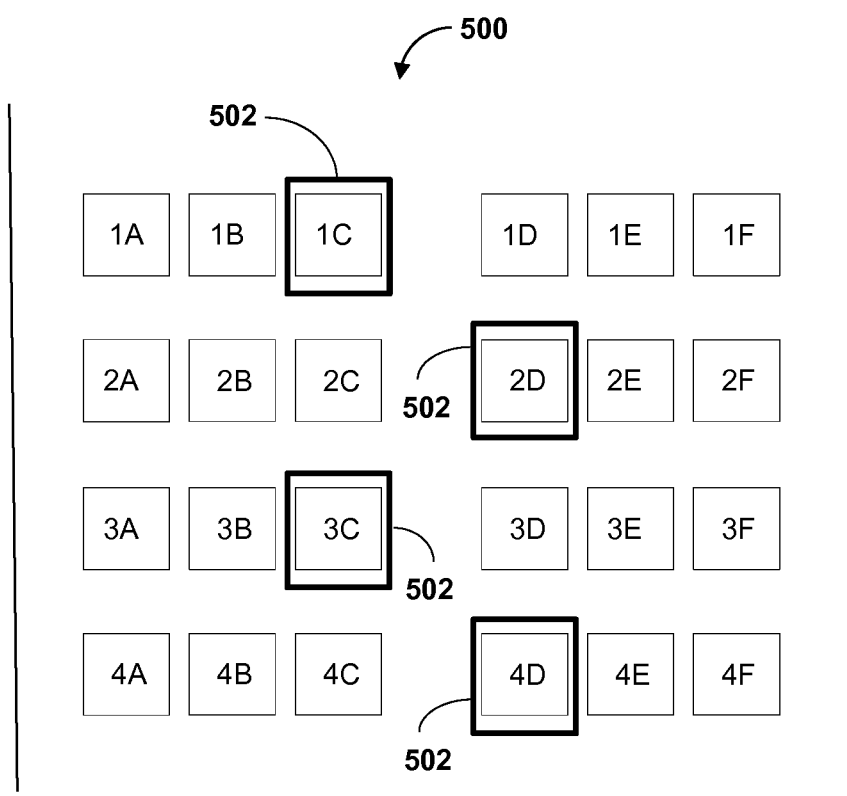
FIGS. 5A and 5B are diagrammatic representations of seating arrangements with deplaning indicators for a portion of an airplane, in accordance with an example embodiment.
Figure 5B:
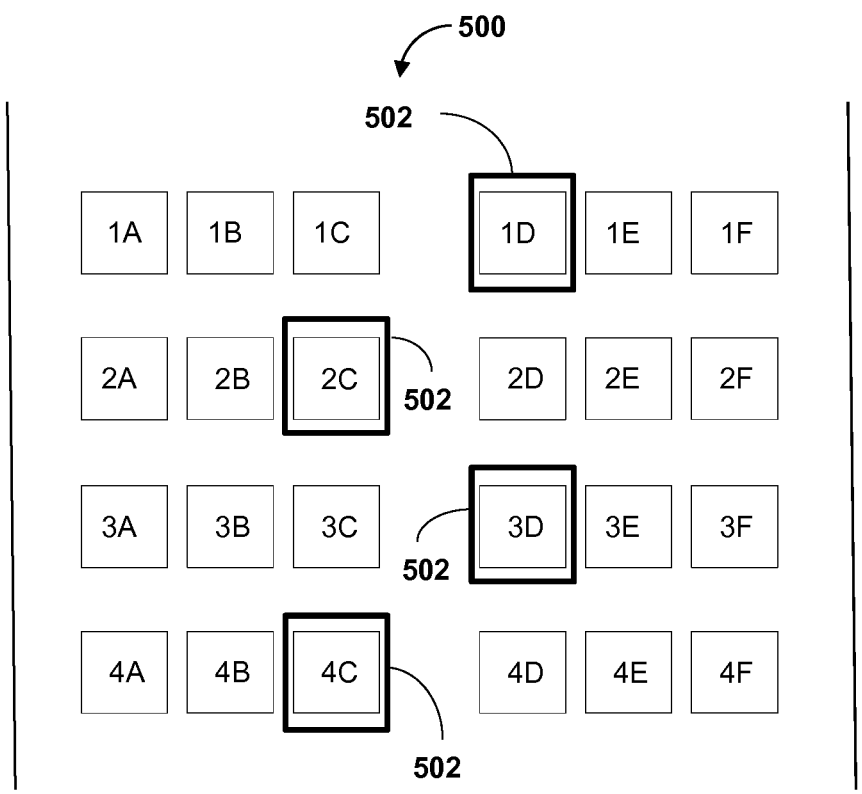

FIGS. 5A and 5B illustrate use of a method of deplaning. The method comprises identifying deplaning information, such as which passengers should exit first, and generating a deplaning plan based on such information. A processor (such as processor 302 in FIG. 3) may be configured to display an indicator, such as a light on a passenger display screen, when that passenger should exit the plane. In FIG. 5A, airplane seating arrangement 500 shows indicators 502 alerting the passengers in seats 1C, 2D, 3C, and 4D that they should deplane. In FIG. 5B, which occurs after FIG. 5A, airplane seating arrangement 500 shows indicators 502 alerting the passengers in seats 1D, 2C, 3D, and 4C that they should deplane.

The software and algorithms of the present disclosure may be used in a variety of ways. For example, such software may be incorporated with a smart phone for use by an airline employee. In other embodiments, the software and algorithms could be used to project information about seating arrangements on the wall of the airplane.

Figure 6:
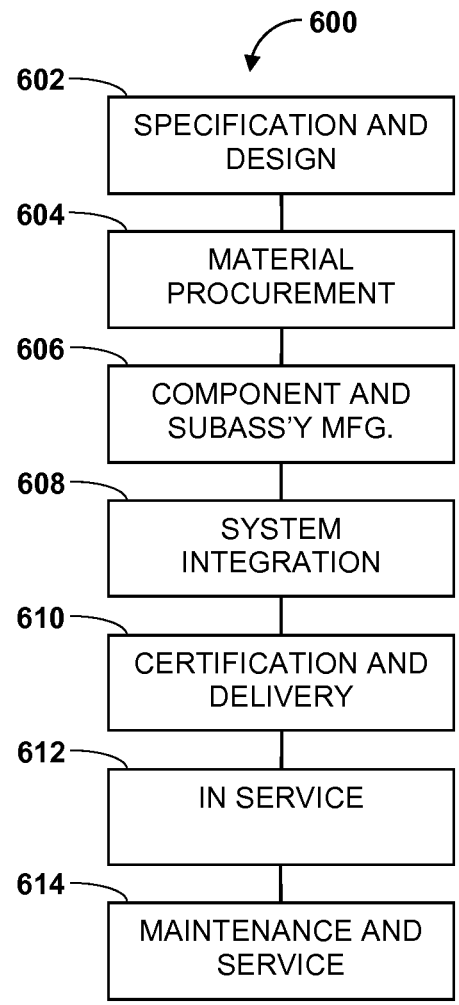
FIG. 6 is a diagrammic representation of a block diagram of an aircraft manufacturing and service method in accordance with an example embodiment.
Figure 7:
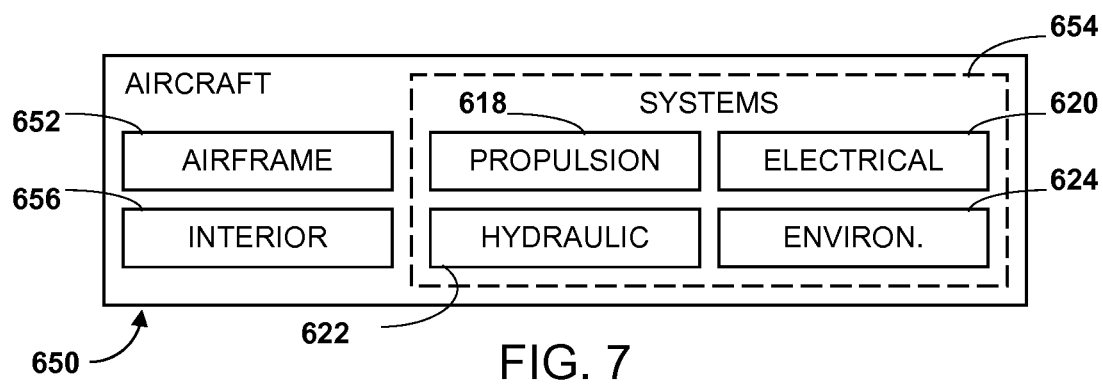
FIG. 7 is a diagrammic representation of a block diagram of an aircraft in which an example embodiment may be implemented.

Example embodiments of the disclosure may be described in the context of an aircraft manufacturing and service method 600 as shown in FIG. 6 and an aircraft 650 as shown in FIG. 7. Turning first to FIG. 6, an illustration of an aircraft manufacturing and service method is depicted in accordance with an example embodiment. During pre-production, exemplary method 600 may include specification and design 602 of the aircraft 650 in FIG. 7 and material procurement 604. For example, a digital seat ordering and management system as disclosed herein may be designed during this step 602.

During production, component and subassembly manufacturing 606 and system integration 608 of the aircraft 650 in FIG. 7 takes place. Thereafter, the aircraft 650 in FIG. 7 may go through certification and delivery 610 in order to be placed in service 612. While in service by a customer, the aircraft 650 in FIG. 7 is scheduled for routine maintenance and service 614 (which may also include modification, reconfiguration, refurbishment, and so on).

Each of the processes of method 600 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

With reference now to FIG. 7, an illustration of an aircraft 650 is depicted in which an example embodiment may be implemented. In this example the aircraft 650 produced by exemplary method 600 in FIG. 6 and may include an airframe 652 with a plurality of systems 654 and an interior 656. Examples of high-level systems 654 include one or more of a propulsion system 618, an electrical system 620, a hydraulic system 622, and an environmental system 624. In an example embodiment, the method and system of the present disclosure may be used in electrical system 620. Any number of other systems may be included. Although an aerospace example is shown, the principles of the disclosure may be applied to other industries, such as the automotive industry.

Systems and methods embodied herein may be employed during any one or more of the stages of the production and service method 600 in FIG. 6. For example, components or subassemblies corresponding to production process 606 may be fabricated or manufactured in a manner similar to components or subassemblies produced while the aircraft 650 is in service. Also, one or more apparatus embodiments, method embodiments, or a combination thereof may be utilized during the production stages 606 and 610, for example, by substantially expediting assembly of or reducing the cost of an aircraft 650. Similarly, one or more apparatus embodiments, method embodiments, or a combination thereof may be utilized while the aircraft 650 is in service, for example and without limitation, to maintenance and service 614.

The foregoing description of the specific embodiments will reveal the general nature of the disclosure so others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

What is claimed:

1. A method for configuring an aircraft, the method comprising:
    determining, using a processor and based on first information, a first seating arrangement for an aircraft by associating a plurality of seats in the aircraft with a plurality of seat identifiers, wherein the first seating arrangement comprises an association between each seat identifier and a respective one of the plurality of seats;
    providing a plurality of tickets to a plurality of passengers in accordance with the first seating arrangement, wherein each ticket comprises a respective seat identifier of the plurality of seat identifiers thereby assigning the passenger to the seat associated with the respective seat identifier in accordance with the first seating arrangement;
    after providing the plurality of tickets to the plurality of passengers, receiving second information relating to at least one of a distribution of weight in the aircraft or a fuel efficiency variable for operating the aircraft;
    responsive to receiving the second information, determining, using the processor and based on the second information, a second seating arrangement by modifying the association between at least one seat of the plurality of seats and at least one seat identifier of the plurality of seat identifiers; and
    responsive to determining the second seating arrangement, outputting, by the processor, the plurality of seat identifiers to an electronic display system in the aircraft to cause the electronic display system to display, at each seat, the respective seat identifier associated with the seat in accordance with the second seating arrangement.

2. The method of claim 1, wherein the plurality of tickets are not reissued in response to determining the second seating arrangement.

3. The method of claim 1, wherein the plurality of tickets are provided after the first seating arrangement is determined.

4. The method of claim 1, wherein the plurality of tickets are provided during determination of the first seat arrangement.

5. The method of claim 1, further comprising determining acceptability of the second seating arrangement,
    wherein acceptability of the second seating arrangement is determined before outputting the plurality of seat identifiers to the electronic display system.

6. The method of claim 1, wherein the electronic display system comprises a plurality of display devices, wherein each display device is associated with a respective one of the plurality of seats.

7. The method of claim 1, wherein the first information comprises a variable relating to at least one of seat availability, safety requirements, venue requirements, venue preferences, customer requirements, or customer preferences at a first time.

8. The method of claim 7, wherein the second information further comprises a variable relating to at least one of seat availability, safety requirements, venue requirements, venue preferences, customer requirements, or customer preferences at a second time, wherein the second time is after the first time.

9. The method of claim 1, wherein the electronic display system comprises a plurality of light-emitting diode (LED) screens.

10. The method of claim 1, wherein the electronic display system comprises a plurality of passenger entertainment displays,
    wherein each passenger entertainment display is located at a respective one of the plurality of seats, and
    wherein outputting the plurality of seat identifiers to the electronic display system comprises, for each passenger entertainment display, outputting to the passenger entertainment display the seat identifier associated with the seat at which the passenger entertainment display is located.

11. A seating and display system for an aircraft, the system comprising:
    a plurality of seats in an interior of an aircraft;
    an electronic display system in the interior of the aircraft, wherein the electronic display system comprises at least one display device of a plurality of display devices in the interior of the aircraft; and
    a processor configured to:
        determine, based on first information, a first seating arrangement by associating the plurality of seats with a plurality of seat identifiers, wherein the first seating arrangement comprises an association between each seat identifier and a respective one of the plurality of seats,
        after determining the first seating arrangement, receiving second information relating to at least one of a distribution of weight in the aircraft or a fuel efficiency variable for operating the aircraft,
        responsive to receiving the second information, determine, based on the second information, a second seating arrangement by modifying the association between at least one seat of the plurality of seats and at least one seat identifier of the plurality of seat identifiers, and responsive to determining the second seating arrangement, causing the electronic display system to display, at each seat, the respective seat identifier associated with the seat in accordance with the second seating arrangement.

12. The system of claim 11, wherein each display device comprises a light-emitting diode (LED) screen.

13. The system of claim 11, wherein each display device comprises a passenger entertainment display located at a respective one of the plurality of seats, and
wherein outputting the plurality of seat identifiers to the electronic display system comprises, for each passenger entertainment display, outputting to the passenger entertainment display the seat identifier associated with the seat at which the passenger entertainment display is located.

14. The method of claim 1, wherein the plurality of seats are arranged in a plurality of rows in the aircraft with a subset of seats in each row,
wherein the electronic display system comprises a plurality of display devices,
wherein each display device is located above a respective one of the plurality of rows, and
wherein outputting the plurality of seat identifiers to the electronic display system comprises, for each display device, outputting to the display device the seat identifiers associated with the subset of seats in the respective row that the display device is located above.

15. The method of claim 1, wherein receiving the second information comprises receiving an input from a mobile device on the aircraft.

16. The system of claim 11, wherein the plurality of seats are arranged in a plurality of rows in the aircraft with a subset of seats in each row,
wherein each display device is located above a respective one of the plurality of rows, and
wherein, to cause the electronic display system to display the respective seat identifier, the processor is configured to, for each display device:
output, to the display device, the seat identifiers associated with the subset of seats in the respective row that the display device is located above.

17. A method for configuring an aircraft, the method comprising:
determining, using a processor and based on first information, a first seating arrangement for an aircraft by associating a plurality of seats in the aircraft with a plurality of seat identifiers, wherein the first seating arrangement comprises an association between each seat identifier and a respective one of the plurality of seats;
providing a plurality of tickets to a plurality of passengers in accordance with the first seating arrangement, wherein each ticket comprises a respective seat identifier of the plurality of seat identifiers thereby assigning the passenger to the seat associated with the respective seat identifier in accordance with the first seating arrangement;
after providing the plurality of tickets to the plurality of passengers, receiving second information comprising to a variable related to an operational efficiency of the aircraft;
responsive to receiving the second information, determining, using the processor and based on the second information, a second seating arrangement by modifying the association between at least one seat of the plurality of seats and at least one seat identifier of the plurality of seat identifiers; and
responsive to determining the second seating arrangement, outputting, by the processor, the plurality of seat identifiers to an electronic display system in the aircraft to cause the electronic display system to display, at each seat, the respective seat identifier associated with the seat in accordance with the second seating arrangement.

18. The method of claim 17, wherein the second information relates to a distribution of weight in the aircraft.

19. The method of claim 17, wherein the second information relates to a fuel efficiency variable for operating the aircraft.

* * * * *